(12) United States Patent
Oberg

(10) Patent No.: US 7,595,948 B1
(45) Date of Patent: Sep. 29, 2009

(54) THERMAL ASPERITY DETECTION FOR PERPENDICULAR MAGNETIC RECORDING

(75) Inventor: Mats Oberg, Cupertino, CA (US)

(73) Assignee: Marvell International Ltd., Hamilton (BM)

(*) Notice: Subject to any disclaimer, the term of this patent is extended or adjusted under 35 U.S.C. 154(b) by 1089 days.

(21) Appl. No.: 10/819,333

(22) Filed: Apr. 6, 2004

Related U.S. Application Data

(60) Provisional application No. 60/514,519, filed on Oct. 24, 2003.

(51) Int. Cl.
*G11B 5/02* (2006.01)

(52) U.S. Cl. .................. 360/25; 360/45; 360/68

(58) Field of Classification Search .............. None
See application file for complete search history.

(56) References Cited

U.S. PATENT DOCUMENTS

| | | | |
|---|---|---|---|
| 5,459,679 A * | 10/1995 | Ziperovich | 708/3 |
| 5,841,318 A * | 11/1998 | Cram | 330/9 |
| 6,104,557 A * | 8/2000 | Kasai et al. | 360/46 |
| 6,175,457 B1 * | 1/2001 | Flynn | 360/46 |
| 6,219,192 B1 * | 4/2001 | Gopalaswamy et al. | 360/25 |
| 6,265,869 B1 | 7/2001 | Takahashi | |
| 6,381,082 B1 * | 4/2002 | Voorman et al. | 360/25 |
| 6,414,806 B1 | 7/2002 | Gowda et al. | |
| 6,452,735 B1 * | 9/2002 | Egan et al. | 360/31 |
| 6,494,085 B2 | 12/2002 | Wakefield et al. | |
| 6,519,103 B2 * | 2/2003 | Cyrusian | 360/46 |
| 6,525,891 B1 | 2/2003 | Tsunoda | |
| 6,661,356 B1 * | 12/2003 | Oberg | 341/58 |
| 6,741,412 B2 * | 5/2004 | Sawaguchi et al. | 360/45 |
| 2002/0034030 A1 * | 3/2002 | Osafune | 360/32 |
| 2003/0107831 A1 * | 6/2003 | Erden et al. | 360/31 |
| 2005/0018337 A1 * | 1/2005 | Tsuchinaga | 360/39 |

OTHER PUBLICATIONS

U.S. Appl. No. 10/737,648, filed Dec. 15, 2003, entitled, "DC-Offset Compensation Loops For Magnetic Recording System", pp. 1-55 and 10 sheets of drawings.

* cited by examiner

*Primary Examiner*—Jason C Olson

(57) ABSTRACT

A perpendicular recording system includes a summing module that has a first input that receives a read signal. A DC correction module selectively generates a DC correction signal to reduce DC offset in the read signal. The DC correction signal is output to a second input of the summing module. A detecting module compares an output of the summing module to a predetermined threshold and selectively detects Thermal Asperity (TA).

32 Claims, 11 Drawing Sheets

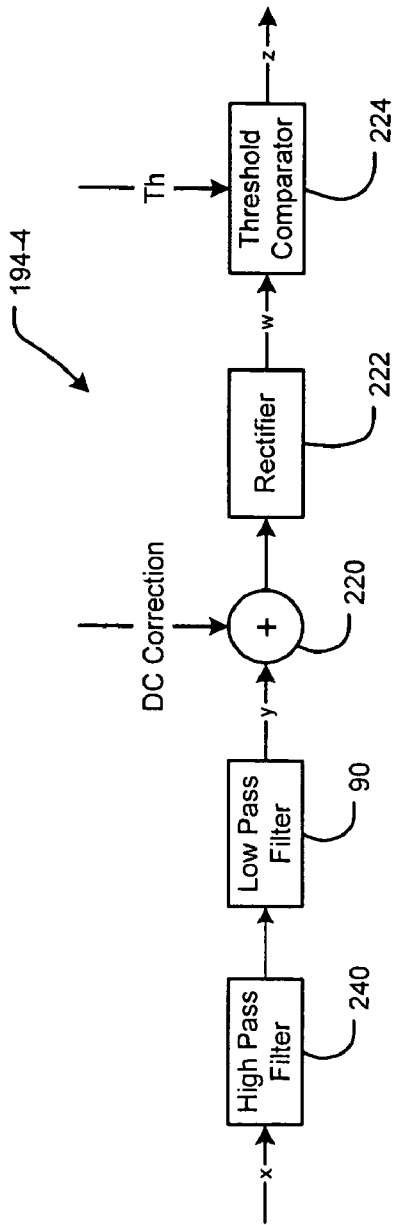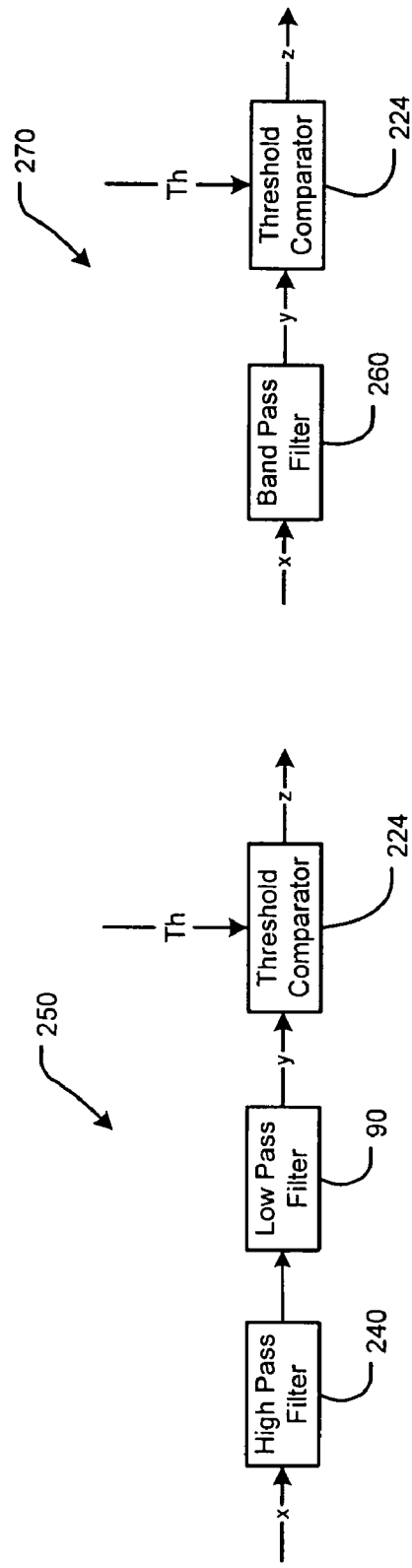
FIG. 16
FIG. 17
FIG. 18

THERMAL ASPERITY DETECTION FOR PERPENDICULAR MAGNETIC RECORDING

CROSS-REFERENCE TO RELATED APPLICATIONS

This application is related to U.S. patent application Ser. No. 10/737,648, filed on Dec. 15, 2003, and claims the benefit of U.S. Provisional Application No. 60/514,519, filed on Oct. 24, 2003, both of which are hereby incorporated by reference in their entirety.

FIELD OF THE INVENTION

The magnetic storage industry has been increasing the storage capacity of hard drives using perpendicular recording systems and magneto-resistive (MR) heads. The MR head includes an MR element that is made of a material that changes electrical resistance in response to magnetic fields. The MR head normally glides over the spinning magnetic disk. When the MR head hits a protruding object on the disk surface, the MR element heats up rapidly. Afterwards, the heat decays relatively slowly. The effect of this transient phenomenon is a change in the baseline of the read-back signal that is output by the MR head. The baseline change contains a substantial low-frequency component, which may cause loss of read-back data. The severity of the loss depends upon the robustness of the data detection system and the rate at which TA events occur.

TA events usually occur more often in perpendicular recording systems due to the relatively close proximity of the recording head and the magnetic media. Heating of the recording head from the TA event is higher than that experienced in longitudinal recording systems due to the smaller distance between the recording head and the media. The increased heating causes a transient of increased duration and amplitude in the output signal of the recording head. In other words, the recording head signal of perpendicular recording systems typically includes both an increased rate of TA events and TA events that have a longer duration. With the increased likelihood of errors, it is possible that the error correcting code (ECC) that is used in the perpendicular recording system may not be able to regenerate the user data.

In longitudinal recording systems, TA can be detected by low pass filtering the analog read-back signal at, for example, the output of a variable gain amplifier (VGA). The output of a low pass filter (LPF) is compared to a threshold. If the output exceeds the threshold, a TA event is declared. This technique can apply to the absolute value of the output of the LPF as well. Since the perpendicular recording read-back signal contains a strong low frequency component, it is more likely that false detection of TA events will occur in perpendicular recording systems.

Referring now to FIG. 1, a block diagram of an exemplary read channel for a perpendicular magnetic recording system is shown and is generally designated 20. A preamp module 24 receives a read signal from a MR head 26, which is positioned by a read/write arm 28 relative to a magnetic storage medium 30. A spindle motor 32 rotates the magnetic storage medium 30. An output of the preamp module 24 is coupled to an input network 40, which has an output that is connected to a variable gain amplifier (VGA) module 42. The input network 40 typically includes one or more resistors and/or capacitors.

A TA detector (TAD) module 46 and a continuous time filter (CTF) module 50 receive an output of the VGA module 42. An output signal of the TAD module 46 indicates whether a TA event is detected. The CTF module 50 low pass filters and shapes the output of the VGA module 42. An analog to digital converter (ADC) module 60 samples the output of the CTF module 50 and generates a digital output. A finite impulse response (FIR) equalizer 64 equalizes an output of the ADC module 60. A data detector module 66 detects the read data in the filtered read data signal. A reconstruction filter module (RF) 70 receives an output of the data detector module 66 and reconstructs the input signal without the TA and DC offset errors. The reconstruction filter module 70 is typically an FIR filter whose taps are the equalization target, although other reconstruction filters may be used. For example, if the equalization target is (5, 6, 0, −1), then the FIR taps should be $f_0=5$, $f_1=6$, and $f_3=-1$.

A timing control module 74 receives outputs of the ADC module 60 and the reconstruction filter module 70 and generates timing signals for the ADC module 60. An automatic gain control (AGC) module 78 adjusts the gain of the VGA module 42 based on the output of the ADC module 60, the FIR equalizer module 64 and the reconstruction filter module 70. Additional details of the reconstruction filter module 70 can be found in U.S. patent Ser. No. 10/754,325, which was filed on Jan. 9, 2004 and which is hereby incorporated by reference in its entirety.

Referring now to FIGS. 2, 3A and 3B, an example of one TAD module 46-1 is shown in FIG. 2 to include a LPF 90, a rectifier 92 and a threshold comparator 94. The rectifier 92 rectifies negative signals when the MR head inputs are reversed. The input signal x is filtered by the LPF 90, which has an output signal y that is input to the rectifier 92. An output signal w of the rectifier 92 is input to a threshold comparator 94. If the input signal w to the threshold comparator 94 is larger than a predetermined threshold, the output signal $z=1$, otherwise $z=0$. In FIG. 3A, an example of a TAD module 46-2 without the rectifier 92 is shown. In FIG. 3B, a first threshold comparator 95-1 compares the output of the LPF 90 to a first threshold $Th_1$. A second comparator 95-2 compares the output of the LPF to a second threshold $Th_2$. The first and second thresholds may have the same magnitude and opposite polarity.

Baseline wander may increase the probability of false TA detection, or, if the detection threshold is permanently adjusted for baseline wander, the probability of detecting an actual TA event decreases. In FIGS. 4-7, examples of different waveforms are shown at the output of the VGA module 42 and the output of the LPF 90 in the TAD module 46. In these examples, the TAD module 46-2 shown in FIG. 3A is used.

Referring now to FIG. 4A, an output signal 98 of the VGA module 42 for a perpendicular waveform corresponding to a random data sequence is shown. In FIG. 4B, an output 100 of the LPF 90 of the TAD module 46-2 is shown with a TA threshold 102. Since the output 100 of the LPF 90 is below the TA threshold 102, a TA event is not detected.

Referring now to FIGS. 5A and 5B, an output signal 98' of the VGA module 42 that is similar to the waveform in FIG. 4A is shown. A TA event is added to the random data sequence as shown at 110. An output 112 of the LPF 90 exceeds the TA threshold 102 and a TA event is detected.

Referring now to FIGS. 6A and 6B, an input waveform includes a relatively long negative signal that is followed by a relatively long positive signal. In FIG. 6A, a solid waveform 120 represents a read-back signal without the high pass filtering effect of the preamplifier 24 and input network 40. A dashed waveform 124 in FIG. 6A represents a read-back signal that is distorted by the high pass filtering effect of preamplifier 24 and the input network 40. An output 126 of the LPF 90 of the TA detector 46-2 is shown in FIG. 6B along with the threshold 102. Since the output signal 126 exceeds the TA threshold 102, a false TA event is detected. The reason for this false detection is that baseline wander, which is the difference between the non-distorted waveform 120 and the distorted waveform 124 in FIG. 6A adversely impacts the output signal 126 of the low pass filter 90 as well. In this case, the output signal 126 of the LPF 90 exceeds the TA threshold 102 around the transition. Raising the threshold would prevent this problem.

Referring now to FIGS. 7A and 7B, an output signal 130 corresponding to a random waveform with TA is shown. In this case, undetected TA 132 occurs in an output signal 134 of the LPF 90 when the waveform without the TA is negative. In this example, a TA event would not be detected unless the TA threshold 102 is lowered.

As can be appreciated from the forgoing, in some cases the TA event is detected when it should not have been detected. In other cases, the TA event is not detected when it should have been detected. There is a trade-off between false detection and missed detection in conventional approaches. If the threshold is lowered, the likelihood of detecting false TA events increases. If the threshold is increased, the likelihood of correctly detecting TA events decreases.

SUMMARY OF THE INVENTION

A perpendicular recording system according to the present invention includes a summing module that has a first input that receives a read signal. A DC correction module selectively generates a DC correction signal to reduce DC offset in the read signal. The DC correction signal is output to a second input of the summing module. A detecting module compares an output of the summing module to a predetermined threshold and selectively detects Thermal Asperity (TA) events based on the comparison.

In other features, an input filter receives the read signal from a preamplifier and filters the read signal. A variable gain amplifier (VGA) module amplifies the read signal and outputs the read signal to the first input of the summing module. A magnetic storage medium stores magnetic fields. A magneto-resistive head reads the magnetic fields stored on the magnetic medium and generates the read signal.

In other features, a variable gain amplifier (VGA) module amplifies the read signal with the DC offset. A filter module receives an output of at least one of the VGA module and the summing module. An analog to digital converting (ADC) module samples the read signal with the DC offset that is output by the filter module and generates a digital read signal with DC offset. An equalizing module communicates with the ADC module and equalizes the digital read signal with the DC offset.

In other features, a data detecting module communicates with the equalizing module and detects data in the digital read signal with the DC offset. A reconstruction filter module communicates with the data detecting module and reconstructs the read signal without TA and DC offset errors. The DC correction module generates the DC correction signal based on outputs of the ADC module, the equalizing module and the reconstruction filter module. An automatic gain control (AGC) module generates a gain correction signal that is based on outputs of the ADC module, the equalizing module and the reconstruction filter module.

In other features, the filter module includes a finite impulse response filter. The data detecting module includes a Viterbi detector. The detecting module includes a low pass filter and a threshold comparator that compares an output of the LPF to the threshold.

In still other features, the detecting module includes a low pass filter (LPF) and a rectifier module that receives an output of the LPF. A threshold comparator compares an output of the rectifier to the threshold. The detecting module includes a high bass filter that has an output that communicates with the (LPF).

In other features, the detecting module includes a bandpass filter. A threshold comparator compares an output of the bandpass filter to the threshold. A timing control module generates a timing correction signal that is based on outputs of the ADC module and the reconstruction filter module.

A perpendicular recording system according to the present invention comprises a DC correction module that generates a DC correction signal. A detecting module has a threshold, receives a read signal with DC offset and the DC correction signal, adjusts one of the read signal with the DC offset and the threshold based on the DC correction signal. The detecting module compares the adjusted one of the read signal with the DC offset and the threshold to the other of the read signal with the DC offset and the threshold, and selectively detects Thermal Asperity (TA) events based on the comparison.

In still other features, an input network receives a read signal from the preamplifier and filters the read signal. A variable gain amplifier (VGA) module amplifies the read signal with the DC offset. A magnetic storage medium stores magnetic fields. A magneto-resistive head reads the magnetic fields stored on the magnetic medium and generates the read signal.

In other features, a variable gain amplifier (VGA) module amplifies the read signal. A filter module receives an output of the VGA module. An analog to digital converting (ADC) module samples the read signal that is output by the filter module and generates a digital read signal. An equalizing module communicates with the ADC module and equalizes the digital read signal. A data detecting module communicates with the equalizing module and detects data in the digital read signal. A reconstruction filter module communicates with the data detecting module and reconstructs the read signal without TA and DC offset errors.

In other features, the DC correction module generates the DC correction signal based on outputs of the ADC module, the equalizing module and the reconstruction filter module. An automatic gain control (AGC) module generates a gain correction signal that is based on outputs of the ADC module, the equalizing module and the reconstruction filter module. The filter module includes a finite impulse response filter. The data detecting module includes a Viterbi detector. A timing control module generates a timing correction signal that is based on outputs of the ADC module and the reconstruction filter module.

In other features, the detecting module comprises a low pass filter (LPF) and a summing module that has a first input that communicates with an output of the LPF and a second input that receives the DC correction signal. A threshold comparator compares an output of summing module to the threshold.

In other features, the detecting module comprises a low pass filter (LPF). A threshold comparator adjusts the threshold based on the DC correction signal to create an adjusted threshold and compares an output of LPF to the adjusted threshold. A high pass filter has an output that communicates with the LPF. A rectifier communicates with an output of the summing module and the threshold comparator.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 16 illustrates a fourth implementation of the TA detector of FIG. 12 in further detail;

FIG. 17 illustrates a TA detector according to the present invention with a high pass filter; and FIG. 18 illustrates a TA detector according to the present invention with a band pass filter.

DETAILED DESCRIPTION OF THE PREFERRED EMBODIMENTS

Figure 1:
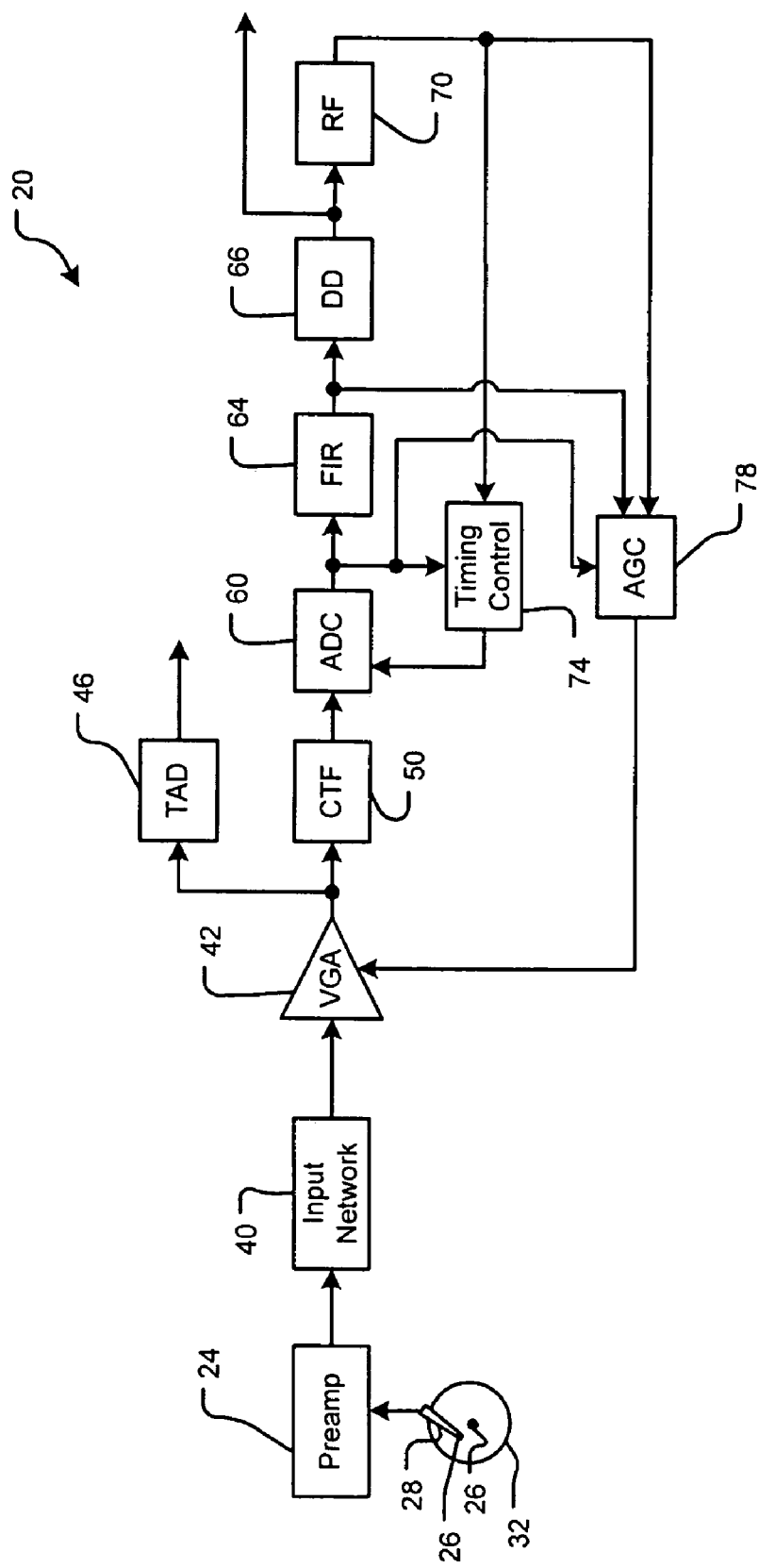
FIG. 1 is a functional block diagram of a read channel for a perpendicular recording system according to the prior art.
Figure 2:
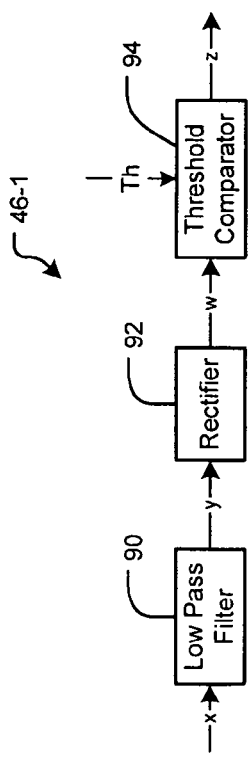
FIG. 2 is a functional block diagram of one Thermal Asperity (TA) detector according to the prior art.
Figure 3B:
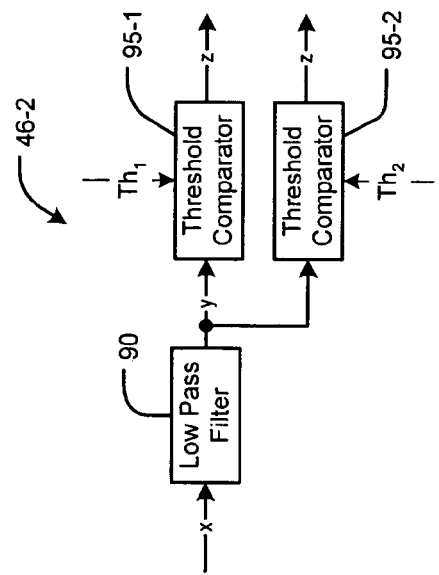
FIGS. 3A and 3B are functional block diagrams of other TA detectors according to the prior art.
Figure 3A:
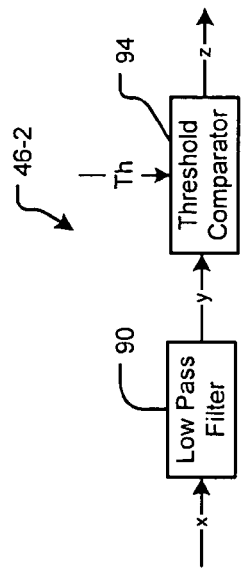
Figure 4A:
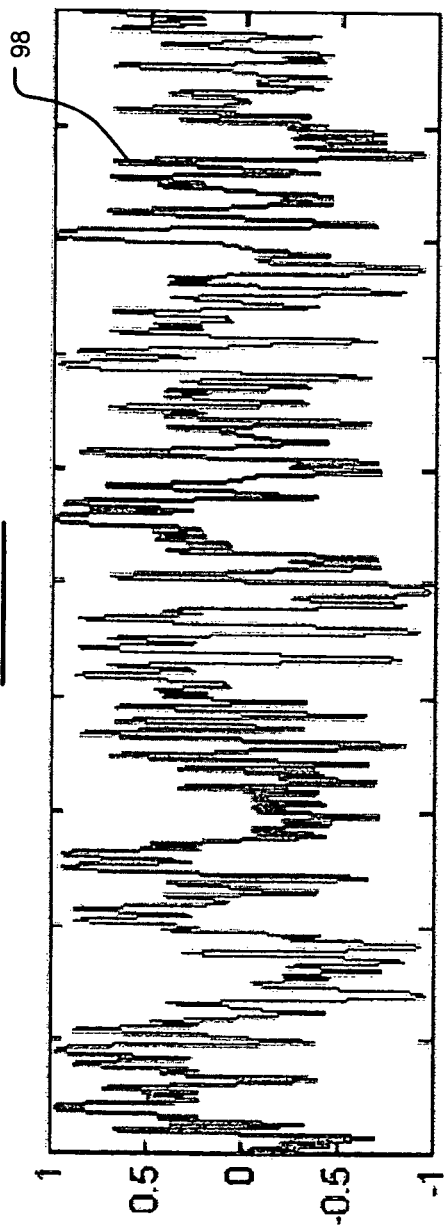
FIGS. 4A and 4B illustrate the output of a variable gain amplifier (VGA) module and a low pass filter (LPF) module in the TA detector of FIG. 3, respectively, for a random input waveform without TA.
Figure 4B:
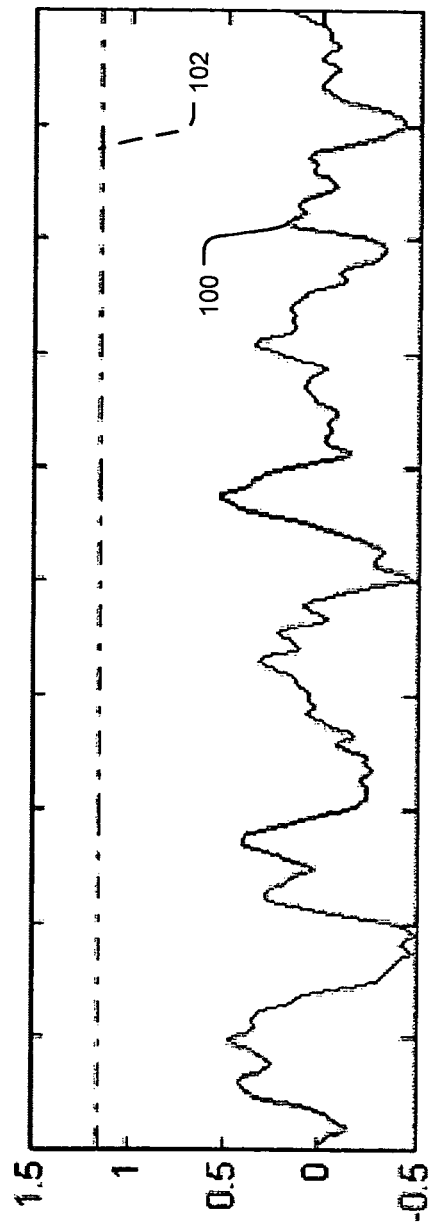
Figure 5A:
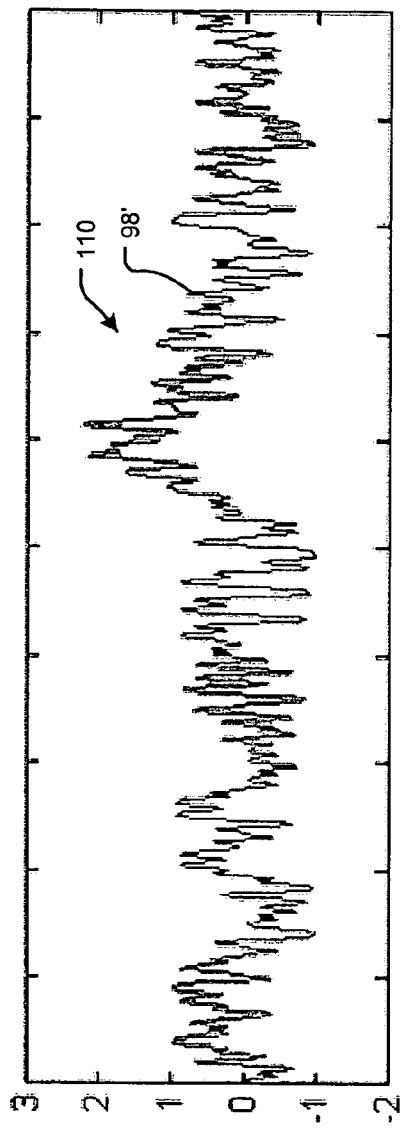
FIGS. 5A and 5B illustrate the output of the VGA module and the LPF module in the TA detector, respectively, for a random input waveform with detected TA.
Figure 5B:
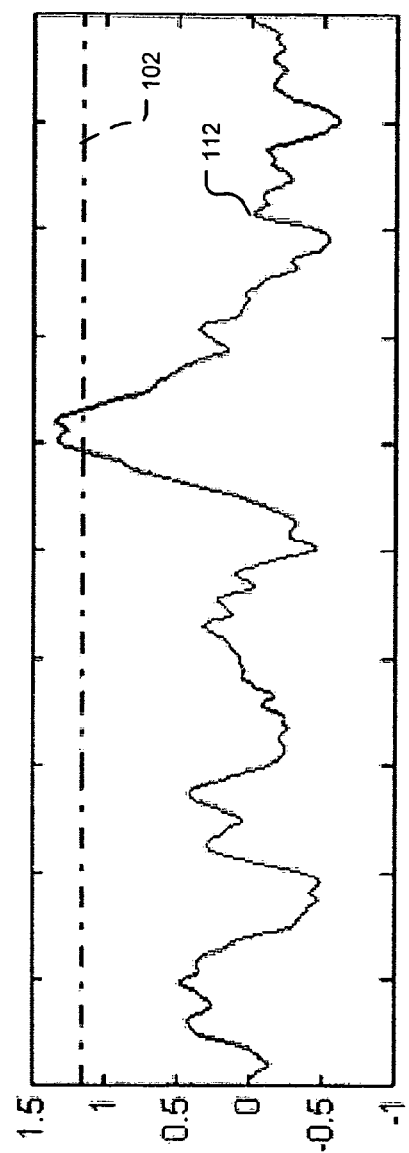

The following description of the preferred embodiment(s) is merely exemplary in nature and is in no way intended to limit the invention, its application, or uses. For purposes of clarity, the same reference numbers will be used in the drawings to identify the same elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Figure 6A:
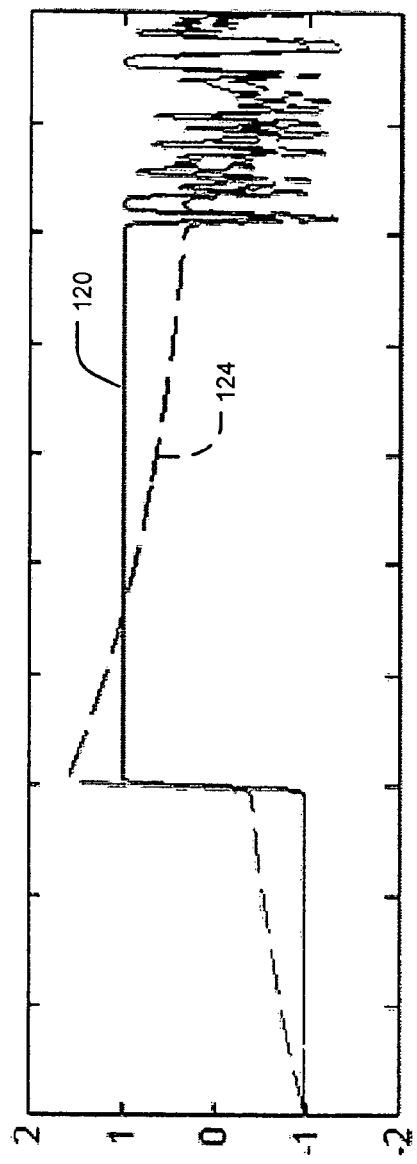
FIGS. 6A and 6B illustrate the output of the VGA module and the LPF module in the TA detector, respectively, for a random input waveform with false detected TA.
Figure 6B:
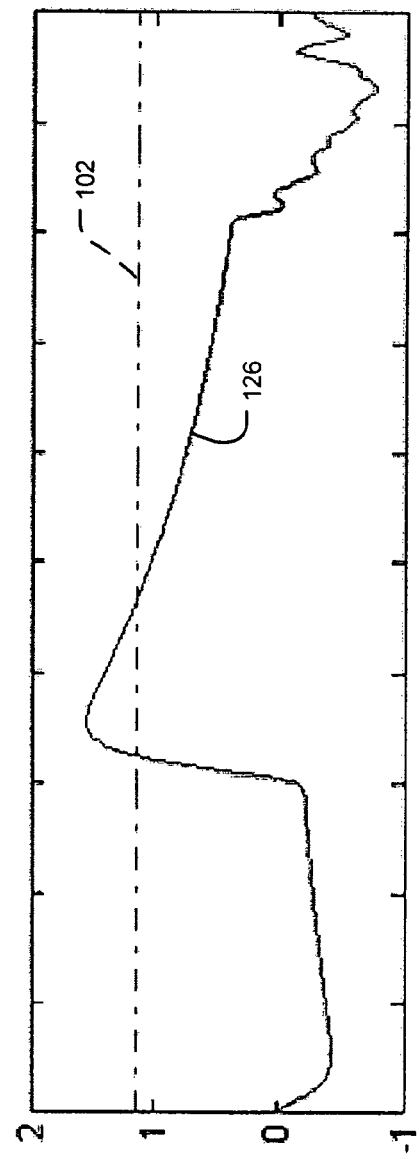
Figure 7A:
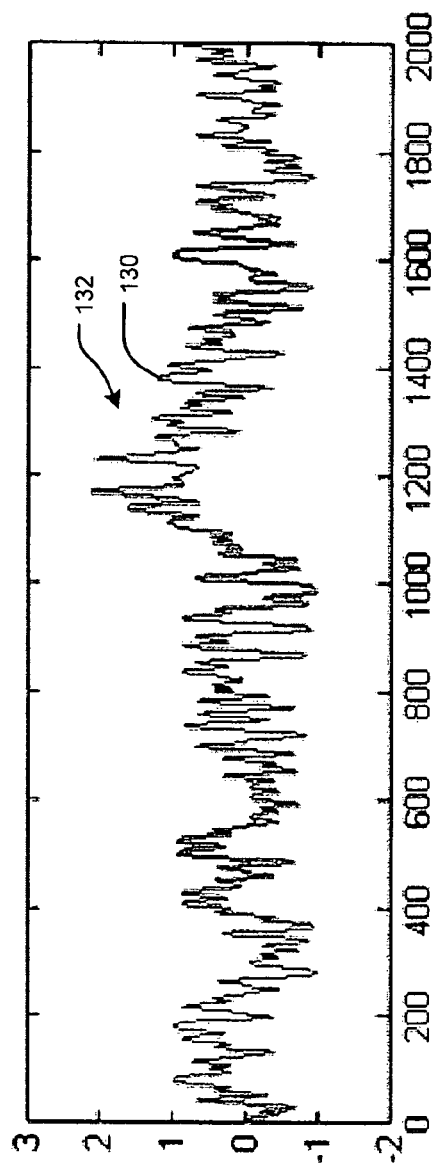
FIGS. 7A and 7B illustrate the output of the VGA module and the LPF module in the TA detector, respectively, for a random input waveform with a higher TA threshold and without false detected TA.
Figure 7B:
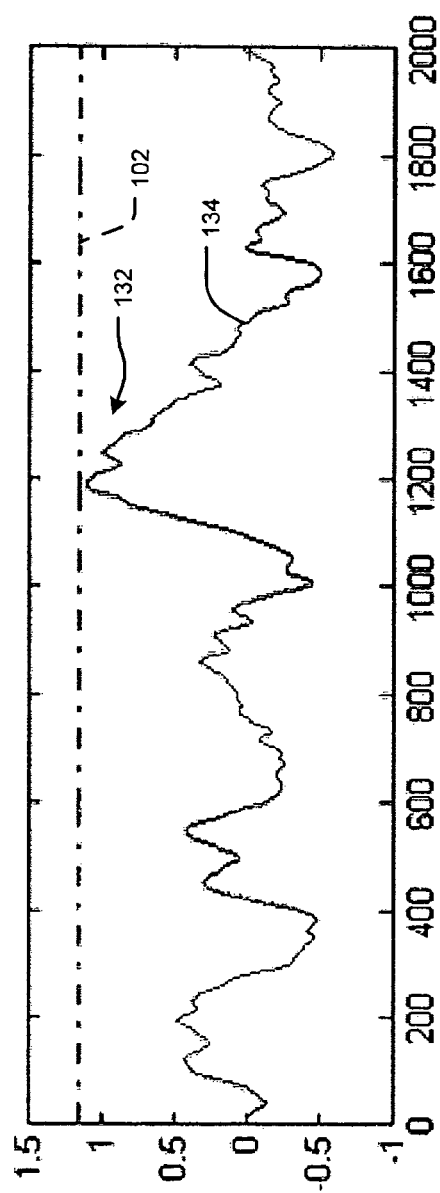

In the example in FIGS. 6A and 6B, false detection of the TA event occurred due to baseline wander. The baseline wander occurs due to high pass filtering effects of the preamplifier 24 and the input network 40. TA detection according to the present invention improves the performance of perpendicular recording systems by compensating for baseline wander as will be described further below.

Figure 8A:
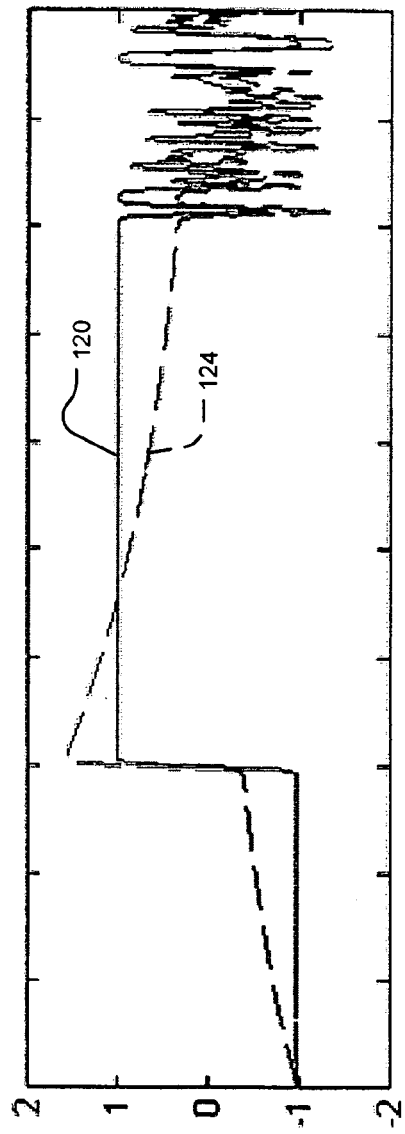
FIGS. 8A and 8B illustrate the output of the VGA module with and without high pass filtering and the output of the LPF module in the TA detector with and without DC correction, respectively, for a random input waveform with false detected TA.
Figure 8B:
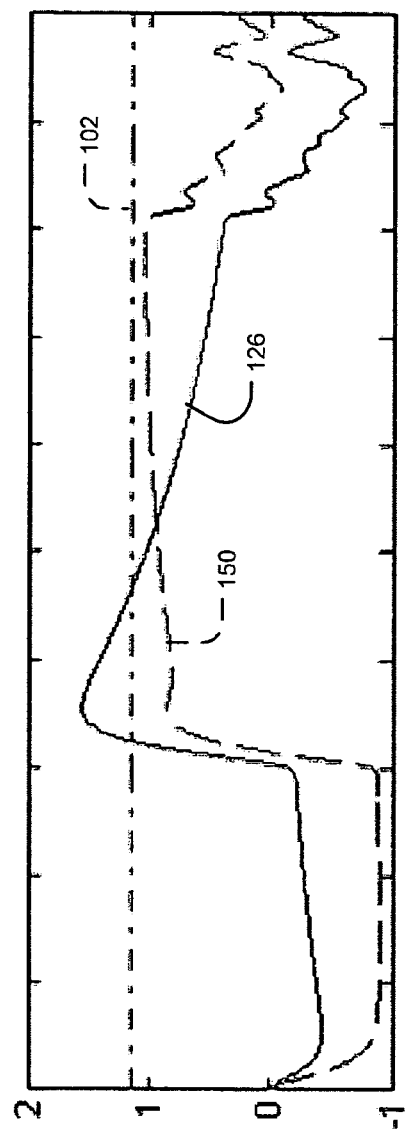

Referring now to FIGS. 8A and 8B, the waveforms from FIGS. 6A and 6B are shown with an additional waveform 150 added to FIG. 8B. The additional waveform 150 corresponds to the output the LPF when DC correction (for baseline wander) is added according to the present invention before the TA detector. If the DC corrected (or baseline wander corrected) signal is used by the TA detector, false detection occurs less often.

Figure 9:
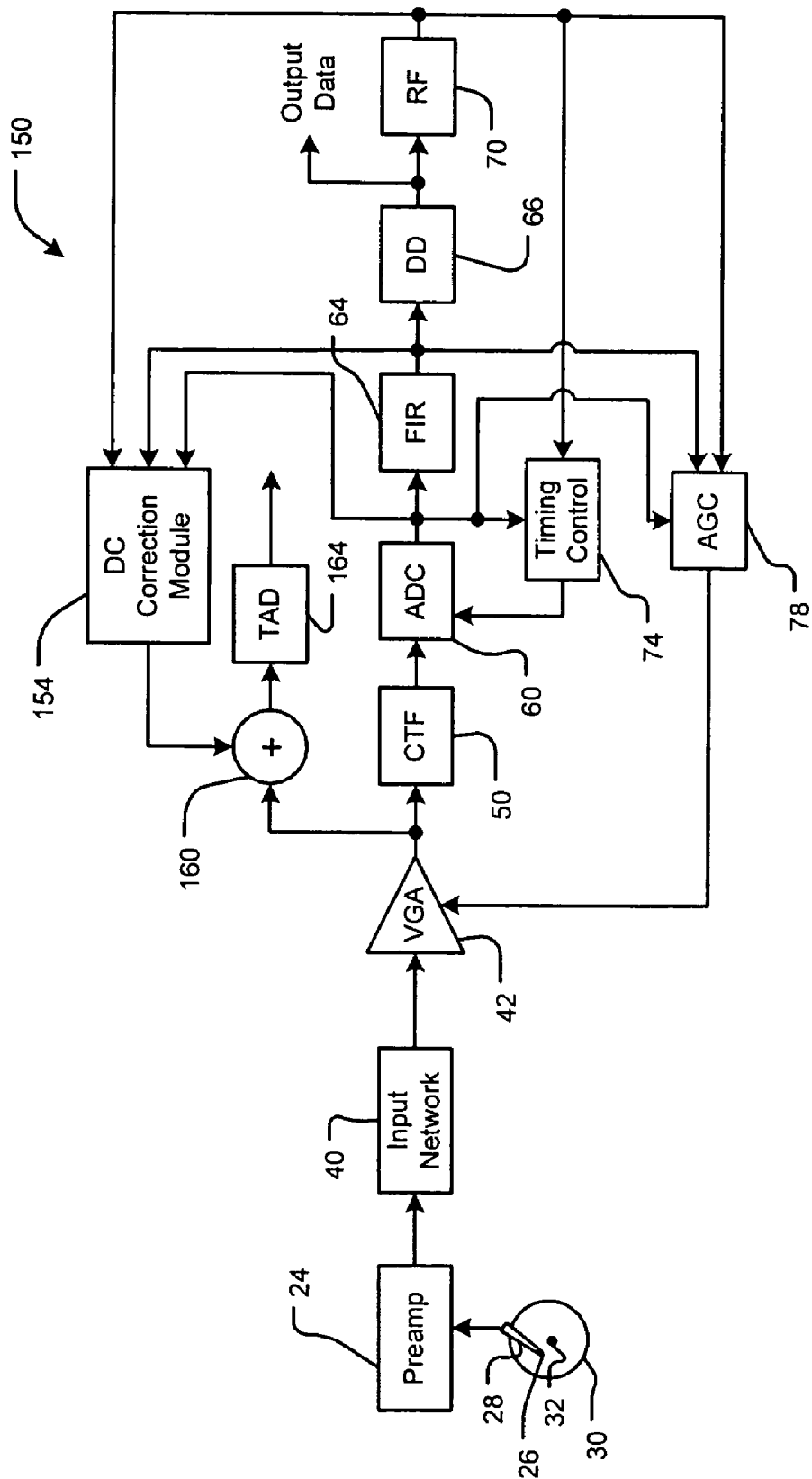
FIG. 9 is a functional block diagram of a read channel for a perpendicular recording system according to the present inventions.
Figure 10:
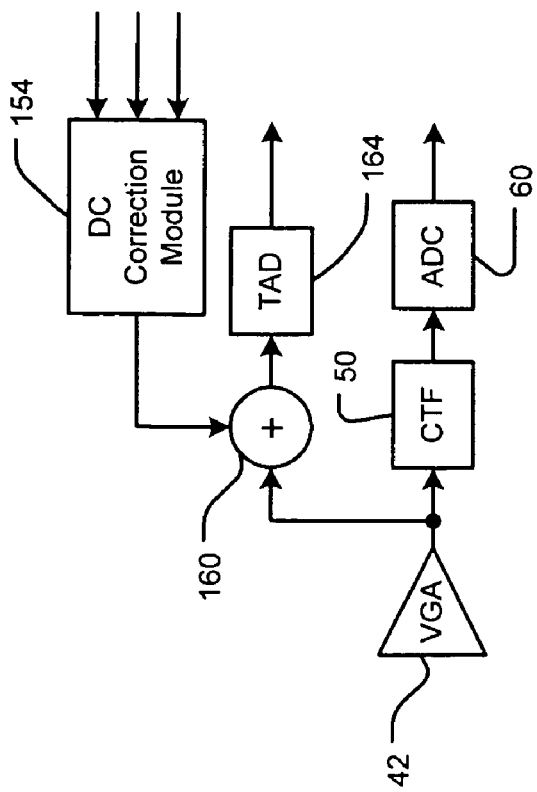
FIG. 10 illustrates part of the read channel of FIG. 9 corresponding to the VGA module, DC correction circuit and TA detector.

Referring now to FIGS. 9 and 10, a DC correction module 154 generates a DC correction signal that is input to a summing module 160. The DC correction signal is related to a difference between the waveforms 120 and 124 in FIG. 8A. In other words, the DC correction signal compensates the read back signal for the high pass filtering effects of the preamplifier 24 and the input network 40. The DC correction signal reduces the DC offset of the read-back signal to which is it applied. Alternately, the DC correction signal adjusts a threshold of a comparator based on the calculated DC offset, as will be described further below.

In one embodiment, the DC correction module 154 receives outputs of the ADC module 60, the FIR equalizer module 64 and the reconstruction filter module 70. Additional details of DC correction modules 154 can be found in U.S. patent application Ser. No. 10/737,648, to Oberg, filed on Dec. 15, 2003, which is hereby incorporated by reference in its entirety. The output of the VGA module 42 is summed by a summing module 160 with the DC correction signal and input to the TAD module 164. The TAD module 164, in turn, determines whether a TA event occurs based, in part, upon a comparison of the output of the summer 160 to a threshold.

Figure 11:
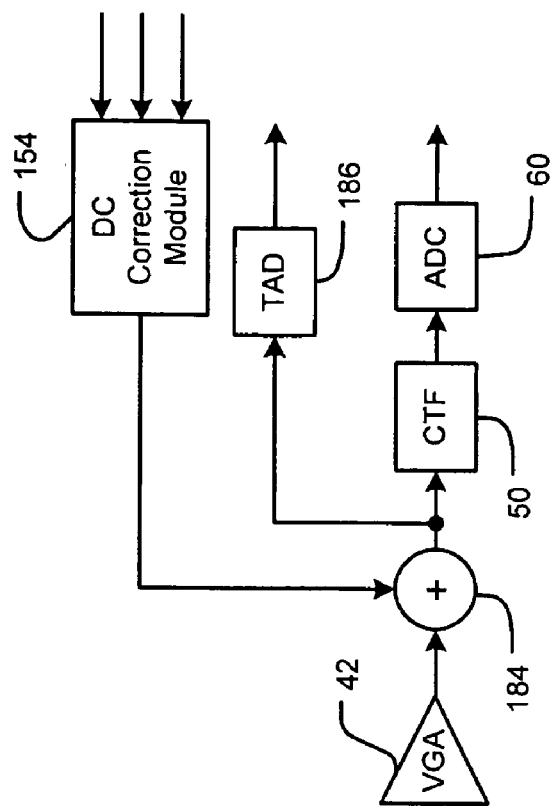
FIG. 11 illustrates a first alternate embodiment of the VGA module, DC correction circuit and TA detector.

Referring now to FIG. 11, the DC correction signal can also be applied to a main data path. In other words, the DC correction module 154 outputs the DC correction signal to a summing module 184, which also receives an output of the VGA module 42. The output of the summing module 184 is fed to a TAD module 186 and to the CTF module 50 as shown.

Figure 12:
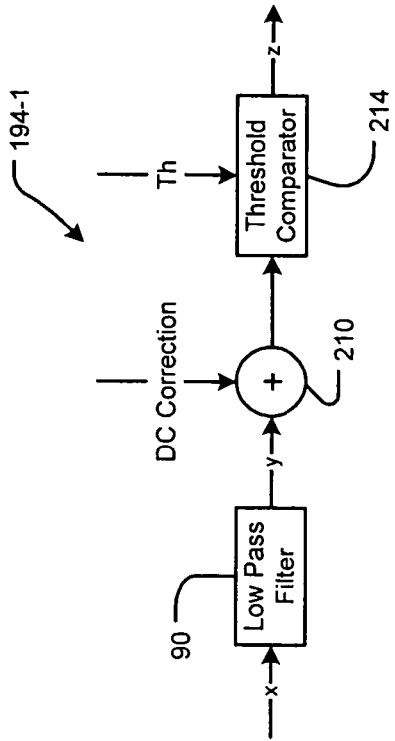
FIG. 12 illustrates a second alternate embodiment of the VGA module, DC correction circuit and TA detector.

Referring now to FIG. 12, the DC correction module 154 outputs the DC correction signal to a TAD module 194, which also receives the output of the VGA module 42. The TAD module 194 determines whether a TA event occurred based on the output of the VGA module 42 and the DC correction signal, as will be described below in conjunction with FIGS. 13-15.

Figure 13:
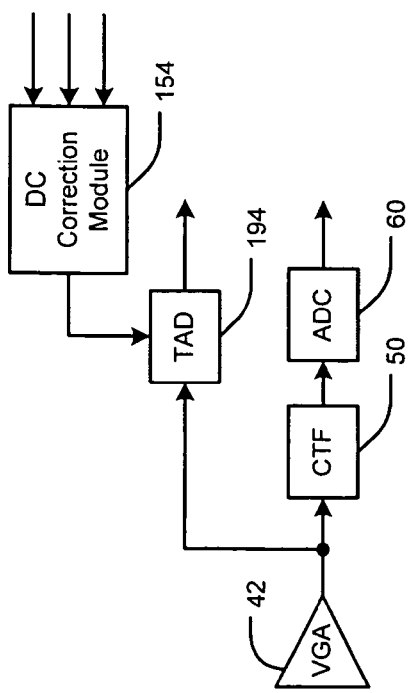
FIG. 13 illustrates one implementation of the TA detector of FIG. 12 in further detail.

Referring now to FIG. 13, one implementation 194-1 of the TAD module 194 of FIG. 12 is shown. The TAD module 194-1 includes the LPF 90, a summing module 210 and a threshold comparator 214. The DC correction signal adjusts the output of the LPF 90. The output of the LPF 90 is input to the threshold comparator 214. The threshold comparator 214 compares the output of the summing module to a threshold.

Figure 14:
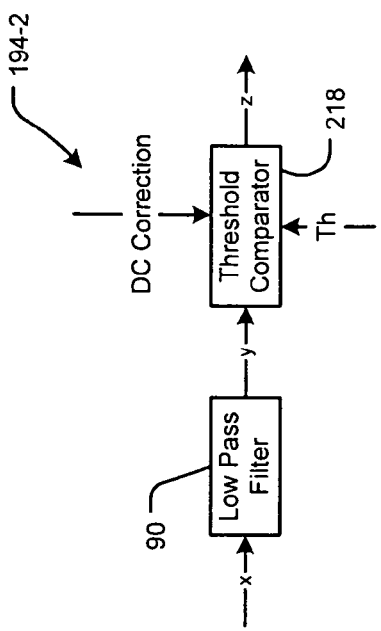
FIG. 14 illustrates a second implementation of the TA detector of FIG. 12 in further detail.

Referring now to FIG. 14, another implementation 194-2 of the TAD module 194 of FIG. 12 is shown. The TAD module 194-2 includes the LPF 90 and a threshold comparator 218. The DC correction signal is input to the threshold comparator 214, which determines whether a TA event occurred based on the DC correction signal, the output of the LPF 90 and an adjustable threshold Th. The TAD module 194-2 adjusts the threshold Th based on the DC correction signal.

Figure 15:
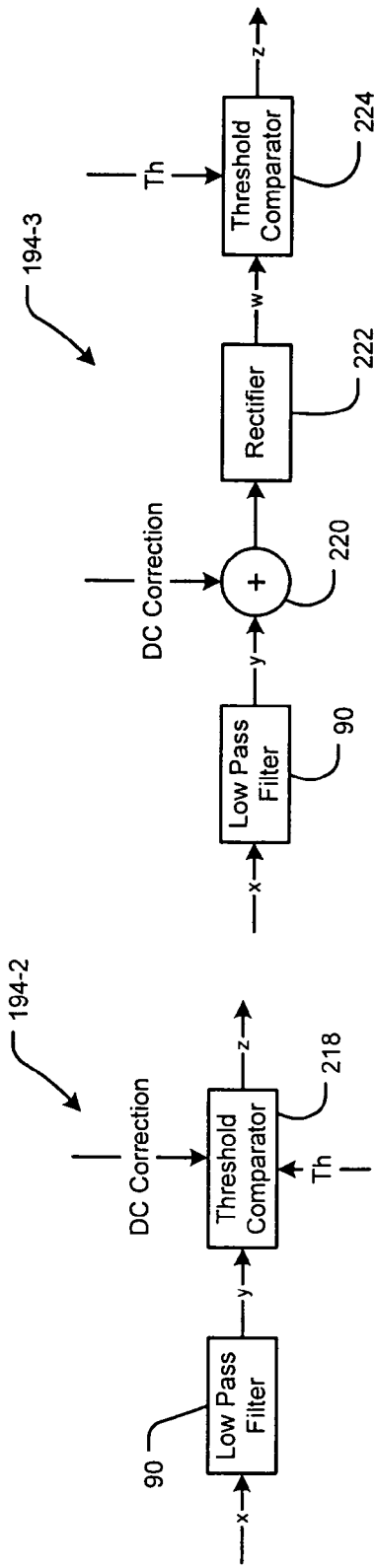
FIG. 15 illustrates a third implementation of the TA detector of FIG. 12 in further detail.

Referring now to FIG. 15, another implementation 194-3 of the TAD module 194 of FIG. 12 is shown. The TAD module 194-3 includes the LPF 90, a summing module 220, a rectifier 222 and a threshold comparator 224. The DC correction signal and an output of the LPF 90 are input to the summing module 220. An output of the summing module 220 is input to the rectifier 222. The output of the rectifier 222 is input to a threshold comparator 214, which determines whether a TA event occurred based on the threshold Th.

Referring now to FIGS. 17 and 18, high pass filters can be added to the TAD modules according to the present invention. In FIG. 17, another implementation 194-4 of the TAD module 194 of FIG. 12 is shown. A high pass filter (HPF) 240 reduces DC levels of the data signal so that a transition following a long DC run (as shown in FIG. 6) will not trigger a false detection. A cut-off frequency of the high-pass filter 240 should be set low enough to allow actual TA to be detected as a TA event. The high pass filter 240 can be added to other TAD modules described herein. For example in FIG. 17, a TAD module 250 includes the high pass filter 240, the LPF 90 and the threshold comparator 224.

Referring now to FIG. 18, when both high pass and low pass filtering is desired, a band pass filter 260 can be used in a TAD module 270. As can be appreciated, the high pass filtering and/or band pass filtering can be used in any of the embodiments described herein.

As can be appreciated by the foregoing, the read channel according to the present invention adjusts either the signal input to the TAD module or the threshold Th used by the TAD module based on the DC offset. As a result, the probability of failing to detect TA events when they occur is reduced. Likewise, the probability of faulty detection of TA events when they do not occur is also reduced. Therefore, the probability of correctly identifying TA events is increased.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A perpendicular recording system, comprising:
    a DC correction module that selectively generates a DC correction signal to reduce DC offset in a read signal; and
    a detecting module that has a threshold, that receives said read signal and said DC correction signal, that adjusts at least one of said read signal and said threshold based on said DC correction signal.

2. The perpendicular recording system of claim 1 wherein said detecting module compares said at least one of said read signal with said DC offset and said threshold to the other of said read signal with said DC offset and said threshold, and that selectively detects Thermal Asperity (TA) events based on said comparison.

3. The perpendicular recording system of claim 1 further comprising:
    a preamplifier;
    an input filter that receives said read signal from said preamplifier and that filters said read signal; and
    a variable gain amplifier (VGA) that amplifies said read signal and outputs said read signal to said detecting module.

4. The perpendicular recording system of claim 1 further comprising a variable gain amplifier (VGA) that amplifies said read signal and outputs said read signal to said detecting module.

5. The perpendicular recording system of claim 3 further comprising:
    a magnetic storage medium that stores magnetic fields; and
    a magneto-resistive head that reads said magnetic fields stored on said magnetic medium and that communicates with said preamplifier.

6. The perpendicular recording system of claim 1 further comprising:
    variable gain amplifier (VGA) module that amplifies said read signal;
    a filter module that filters an output of said VGA module;
    an analog to digital converting (ADC) module that samples said read signal output by said filter module and that generates a digital read signal;
    an equalizing module that equalizes said digital read signal and that generates an equalized read signal;
    a data detecting module that detects data in said equalized read signal; and
    a reconstruction filter module that communicates with said data detecting module and that reconstructs said read signal without TA and DC offset errors.

7. The perpendicular recording system of claim 6 wherein said DC correction module generates said DC correction signal based on outputs of said ADC module, said equalizing module and said reconstruction filter module.

8. The perpendicular recording system of claim 6 further comprising an automatic gain control (AGC) module that generates a gain correction signal that is based on outputs of said ADC module, said equalizing module and said reconstruction filter module.

9. The perpendicular recording system of claim 6 wherein said filter module includes a finite impulse response filter.

10. The perpendicular recording system of claim 6 wherein said data detecting module includes a Viterbi detector.

11. The perpendicular recording system of claim 6 further comprising a timing control module that generates a timing correction signal that is based on outputs of said ADC module and said reconstruction filter module.

12. The perpendicular recording system of claim 1 wherein said detecting module comprises:
    a low pass filter (LPF);
    a summing module that sums an output of said LPF and said DC correction signal; and
    a threshold comparator that compares an output of summing module to said threshold.

13. The perpendicular recording system of claim 1 wherein said detecting module comprises:
    a low pass filter (LPF); and
    a threshold comparator that adjusts said threshold based on said DC correction signal to create an adjusted threshold and that compares an output of LPF to said adjusted threshold.

14. The perpendicular recording system of claim 12 further comprising a high pass filter that has an output that communicates with said LPF.

15. The perpendicular recording system of claim 13 further comprising a high pass filter that has an output that communicates with said LPF.

16. The perpendicular recording system of claim 12 further comprising a rectifier that communicates with an output of said summing module and said threshold comparator.

17. A perpendicular recording system, comprising:
correction means for selectively generating a DC correction signal to reduce DC offset in a read signal; and
detecting means, having a threshold, for receiving said read signal and said DC correction signal, for adjusting at least one of said read signal and said threshold based on said DC correction signal.

18. The perpendicular recording system of claim 17 wherein said detecting means compares said at least one of said read signal with said DC offset and said threshold to the other of said read signal with said DC offset and said threshold, and that selectively detects Thermal Asperity (TA) events based on said comparison.

19. The perpendicular recording system of claim 17 further comprising:
preamplifier means for amplifying; and
input means for receiving a read signal from said preamplifier means and for filtering said read signal; and
a variable gain amplifier (VGA) means that amplifies said read signal and that outputs said read signal to said detecting means.

20. The perpendicular recording system of claim 17 further comprising a variable gain amplifier (VGA) means that amplifies said read signal and that outputs said read signal to said detecting means.

21. The perpendicular recording system of claim 19 further comprising:
storaging means for storing magnetic fields; and
reading means for reading said magnetic fields stored on said storing means and that communicates with said preamplifier means.

22. The perpendicular recording system of claim 17 further comprising:
variable gain amplifier (VGA) means for amplifying said read signal;
filtering means for filtering an output of said VGA means;
analog to digital converting (ADC) means for sampling said read signal that is output by said filtering means and for generating a digital read signal;
equalizing means for equalizing said digital read signal and for generating an equalized read signal;
data detecting means for detecting data in said digital read signal with said DC offset; and
reconstruction filtering means that communicates with said data detecting means for reconstructing said read signal without TA and DC offset errors.

23. The perpendicular recording system of claim 22 wherein said correction means generates said DC correction signal based on outputs of said ADC means, said equalizing means and said reconstruction filtering means.

24. The perpendicular recording system of claim 22 further comprising an automatic gain control (AGC) means that generates a gain correction signal that is based on outputs of said ADC means, said equalizing means and said reconstruction filtering means.

25. The perpendicular recording system of claim 22 wherein said filtering means includes a finite impulse response filter.

26. The perpendicular recording system of claim 22 wherein said data detecting means includes a Viterbi detector.

27. The perpendicular recording system of claim 22 further comprising timing control means for generating a timing correction signal that is based on outputs of said ADC means and said reconstruction filtering means.

28. The perpendicular recording system of claim 17 wherein said detecting means comprises:
low pass filtering (LPF) means for low pass filtering;
summing means that has a first input that communicates with an output of said LPF means and a second input that receives said DC correction signal; and
threshold comparing means for comparing an output of summing means to said threshold.

29. The perpendicular recording system of claim 17 wherein said detecting means comprises:
low pass filtering (LPF) means for low pass filtering said read signal; and
threshold comparing means for selectively adjusting said threshold based on said DC correction signal to create an adjusted threshold and for comparing an output of LPF means to said adjusted threshold.

30. The perpendicular recording system of claim 28 further comprising high pass filtering means for high pass filtering said read signal and that has an output that communicates with said LPF means.

31. The perpendicular recording system of claim 29 further comprising high pass filtering means for high pass filtering said read signal and that has an output that communicates with said LPF means.

32. The perpendicular recording system of claim 28 further comprising rectifying means for rectifying an output of said summing means and that communicates with said threshold comparing means.

* * * * *